United States Patent
Back et al.

(10) Patent No.: US 6,937,862 B2
(45) Date of Patent: Aug. 30, 2005

(54) MAINTAINING ASSOCIATION IN A COMMUNICATIONS NETWORK

(75) Inventors: Juha Back, Espoo (FI); Tony Hulkkonen, Vantaa (FI); Tuija Hurtta, Espoo (FI); Jaakko Rajaniemi, Helsinki (FI); Paul Sitch, Espoo (FI); Joanna Uusikartano, Espoo (FI)

(73) Assignee: Nokia Corporation, Espoo (FI)

( * ) Notice: Subject to any disclaimer, the term of this patent is extended or adjusted under 35 U.S.C. 154(b) by 138 days.

(21) Appl. No.: 10/312,445

(22) PCT Filed: Jun. 26, 2001

(86) PCT No.: PCT/GB01/02871

§ 371 (c)(1),
(2), (4) Date: Jul. 21, 2003

(87) PCT Pub. No.: WO02/01907

PCT Pub. Date: Jan. 3, 2002

(65) Prior Publication Data

US 2004/0029614 A1 Feb. 12, 2004

(30) Foreign Application Priority Data

Jun. 27, 2000 (GB) .............................................. 0015715

(51) Int. Cl.⁷ .............................. H04Q 7/20; H04Q 7/38
(52) U.S. Cl. ................. 455/445; 455/422.1; 455/426.1; 455/560; 455/466; 455/550.1; 455/552.1; 370/352; 370/353; 370/354; 370/355; 370/357; 370/360
(58) Field of Search ............................. 455/445, 422.1, 455/403, 426.1, 426.2, 414.1, 414.4, 432.1, 432.2, 432.3, 433, 435.1, 435.2, 550.1, 552.1, 553.1, 560, 561, 458, 461, 466; 370/352, 353, 354, 355, 356, 357, 360, 386, 400

(56) References Cited

U.S. PATENT DOCUMENTS

| | | | |
|---|---|---|---|
| 6,275,706 B1 | * | 8/2001 | Rune .................... 455/456.1 |
| 2001/0048673 A1 | * | 12/2001 | Verkama et al. .......... 370/329 |
| 2003/0018806 A1 | * | 1/2003 | Rueger et al. ............. 709/238 |
| 2003/0109262 A1 | * | 6/2003 | Scheurich .................. 455/456 |

FOREIGN PATENT DOCUMENTS

| | | |
|---|---|---|
| WO | 99/66740 | 12/1999 |
| WO | 00/18171 | 3/2000 |
| WO | 00/21319 | 4/2000 |
| WO | 00/36869 | 6/2000 |

* cited by examiner

Primary Examiner—Keith T. Ferguson
(74) Attorney, Agent, or Firm—Squire, Sanders & Dempsey LLP (57) ABSTRACT

A method for maintaining association between switching units in a network includes the steps of determining that a call is to be routed via a base station, routing units, and a switching unit. The call is then routed via the base station, at least one routing unit, a routing link, and a switching unit. An association message is transmitted to the switching unit to inform it of an address of an additional switching unit. A mobile station within a coverage area of the base station is capable of communicating with the switching units, and elements of the system are configured to address the additional switching unit to determine whether the mobile station is communicating via an appropriate path.

24 Claims, 3 Drawing Sheets

MAINTAINING ASSOCIATION IN A COMMUNICATIONS NETWORK

The present invention relates to a method for maintaining association between switching units in a network.

A universal mobile telecommunications system (UMTS) can be considered to be comprised of two parts, a radio access network (RAN) and a core network (CN). It is generally connected to user networks.

The radio access network refers to a "radio link" between mobile stations and the core network which allows mobile phones to make calls. It includes mobile stations (MSs) e.g. mobile phones belonging to users of the system, base stations (BSs) and radio network controllers (RNCs). Together the base stations cover the entire radio access area, so that when a user is located within this area, his or her mobile phone can attach to the most appropriate base station. Each MS may have a number of data connections open running over a number of different base stations. The most appropriate base station for each data connection is determined by a combination of parameters including the user location and network management considerations. Each RNC controls a number of base stations. They have network management responsibilities such as allocation of base stations to mobile phones and they also provide a connection between the base stations and the core network.

The core network refers to the part of the system which provides a switching service to mobile phones allowing them to access the user networks through the RNCs. The core network comprises two domains in the form of two types of switching equipment. The first is mobile switching centres (MSCs) which connect to circuit switched user networks and the second is serving GPRS (general packet radio service) support nodes (SGSNs) which connect to packet switched user networks. The core network connects to the user networks via gateways. Usually, each RNC is connected to one MSC and one SGSN, which are known as "partner CN nodes".

As indicated above, user networks can be categorised into two types. The first type is a circuit-switched (CS) network such as a public switched telephone network (PSTN). This is a telephone network which provides various services such as traditional telephone services and ISDN links. Data is transferred by permanent land lines and connections are made by switching which connects up the appropriate circuit for the connection required.

The second type is a packet-switched (PS) network, which uses the same technology as that of the internet. Within such a network, the data is transferred in the form of "packets" which are short bursts of data. Transportation in this manner allows packets of different data streams to be interspersed with one another so as to allow efficient use of the network by a number of users.

Conventionally a mobile phone could only be connected to one or other of the circuit-switched network or the packet-switched network at once, and would therefore be connected to either an MSC or an SGSN via a "serving" RNC (SRNC). However, if a phone had the capability of running two activities at once, it could be connected to both at once, since it is possible for the SRNC to be connected to an MSC and an SGSN at the same time. Thus it could be connected to both partner MSC and SGSN.

The interface between an MSC and an SGSN is known as the Gs interface and it represents an interface between the circuit-switched and packet-switched networks. It would be desirable to use the Gs interface to co-ordinate paging between the core network domains and perform activity enquiries between the SGSN & MSC, provided it could be done avoiding excessive complexity.

Paging involves sending a message to a specific mobile station on a broadcast channel. Paging co-ordination can be considered in simple terms as being able to ask the partner CN node to which RNC the partner CN node is connected, thus providing a route to the mobile station. If the partner CN node can supply such an SRNC address (meaning that the mobile is in connected mode to the partner CN node and thus to one of the service networks), then the CN node itself may ask this SRNC to page as opposed to asking its partner CN node to do the paging. This is because the RNC-CN functional split is such that it is the RNC that co-ordinates the air interface for both core network domains. Such a control is not possible in GSM/GPRS networks, but it would be desirable to enable such co-ordination in a UMTS system.

Activity enquiries are services where, for example, an SGSN asks an MSC if a particular mobile phone has an active connection with the MSC and the MSC immediately replies, either giving the SRNC address if there is an active connection or indicating that there is no active connection. Another type of service is where the SGSN asks to be informed when the MSC (de)activates a connection, and at some later time when this requirement is satisfied, the MSC replies (also with the SRNC address). This kind of message has been proposed in a base station system application part plus (BSSAP+) protocol, but would require modification for use over a Gs interface. It would be desirable to provide a way of establishing the requirements of making such modification and providing a way of putting it into practice.

According to the present invention there are provided methods for maintaining association between units in a network as set out in the accompanying claims.

The invention will now be described by way of example with reference to the accompanying drawings in which.

In order to implement association update capability functionality between an SGSN and an MSC, two possible routes are:

1. Maintain an explicit relationship between the MSC and SGSN at all times. This is done by introducing new association update messages on the Gs interface. This is a different situation from the one in a GSM/GPRS system in which the relationship was only maintained under certain conditions. In GSM, the Gs interface was used for paging co-ordination and combined radio area/location area (RA/LA) periodic update and attach and detach procedures, in order to save resources on the air interface. In a UMTS system, as explained above, paging can be coordinated via an SRNC. The combined update would be used together with maintaining the explicit relationship because in this route the explicit link between MSC & SGSN must be initiated.

2. No explicit relationship is maintained between the SGSN & MSC. Instead a look up is performed to a home location register (HLR) to determine the address of the partner node. An HLR is associated with a particular network provider and it contains lists such as mobile telephone numbers of users of the network. It is also possible for it to store the addresses of any MSCs and SGSNs within the network, as will be described below. If the address of the partner node can thus be supplied, the CN node can then co-ordinate its activities with its partner node. These activities include requesting an SRNC address if paging is implemented or sending/receiving an activity enquiry if activity services must be implemented. This solution involves enquiry signalling on the Gr (MSC/SGSN to HLR) interface and activity enquiry/response signalling on the Gs interface.

Both options 1 and 2 add additional messages and complexity to the signalling procedures. However, the procedures are required since in a UMTS system there may not be an explicit relationship between radio area identities (RAIs) and location area identities (LAIs) to define the functionality of the Gs. Activity enquiry services as suggested above already exist for an MSC to make enquiries to an SGSN in GSM/GPRS, but the implementation required is different for UMTS.

In order to facilitate understanding of the invention as exemplified in the embodiment, there follows an explanation of the radio areas and location areas and their relationship with RNCs.

The area relations between the RAs and LAs have some impact on the Gs interface functionality. This is because there is a requirement to use some kind of association to find out the SRNC that is connected to partner CN nodes, without having to page a mobile station. This would be in addition to partner nodes knowing one another's addresses. Thus the requesting node can make the page itself.

In a UMTS system a mobile phone is considered to be physically within a certain area which is covered by an RNC and a partner SGSN and MSC. Location areas (LAs) refer to an area covered by an MSC and radio areas (RAs) refer to the area covered by an SGSN. A mobile phone's position may cause it to span one or more LAs/RAs, for example when it is moving between two LAs/RAs. A number of RNC coverage areas are shared by both partner CN nodes, which is the reason that determination of the RNC address is important.

Figure 5A:
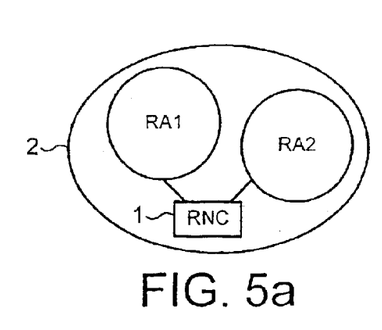
FIGS. 5a–5b shows the situation of one or more RAs/LAs under one RNC area
Figure 5B:
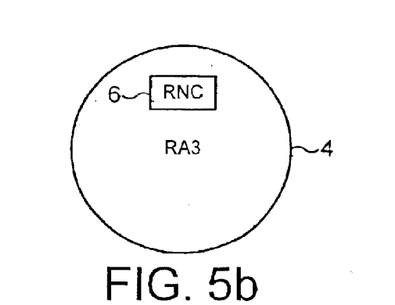

There are two different area relation situations:

(i) One or more than one RAs/LAs under one RNC area—if an RNC area is bigger than or the same size as an RA/LA, in other words if there are one or more RAs/LAs per one RNC area, the RNC will be known if RA/LA is known. In other words the SRNC of every attached mobile station is known. This situation is depicted in FIG. 5. In FIG. 5a there is shown a first RNC 1 which is capable of communicating with two RAs, RA1 and RA2. The area of RNC 1, is shown by reference numeral 2 and is bigger than either RA. In FIG. 5b there is shown one RNC 6 and one RA, RA3. In this case the area of RNC 6 is equal in size to RA3.

Figure 6A:
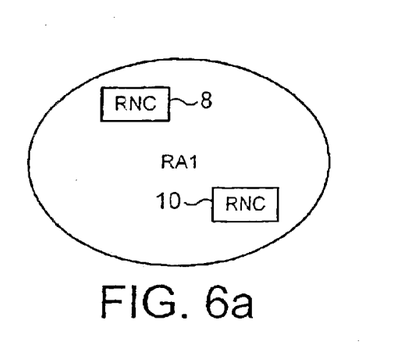
FIGS. 6a–6b shows the situation of more than one RNC under one RA/LA In the figures like reference numerals indicate like parts.
Figure 6B:
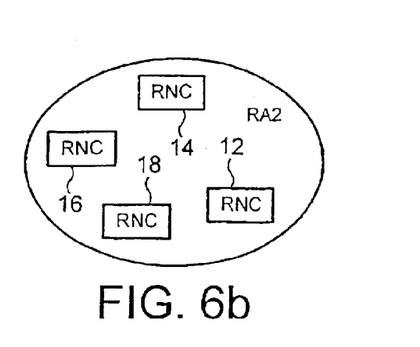

(ii) More than one RNC under one RA/LA—if an RA/LA is bigger than an RNC area, SRNC information is needed to avoid unnecessary paging/enquiry to inactive RNC areas. If only the RA/LA of a mobile station is known, paging is performed in all RNC areas that reside in that RA/LA. However, it would be preferable for paging to be improved by targeting it to the SRNC area only. This situation is depicted in FIG. 6. In FIG. 6a, two RNCs, RNC 8 and RNC 10 are located within RA1. In FIG. 6b, four RNCs, RNC 12, RNC 14, RNC 16 and RNC 18 are located within RA2. It can be understood that the more RNCs are located within an RA, the more unnecessary enquiries by MSCs or SGSNs will take place unless there is a way of determining which RNC is the one to which a mobile phone is attached. The systems of FIGS. 5 and 6 could be adapted to employ the same principles in respect of SGSNS and LAs.

Having explained the effect of the radio and location areas, the method and apparatus used in the embodiment to facilitate the association requirements will now be described.

Figure 1:
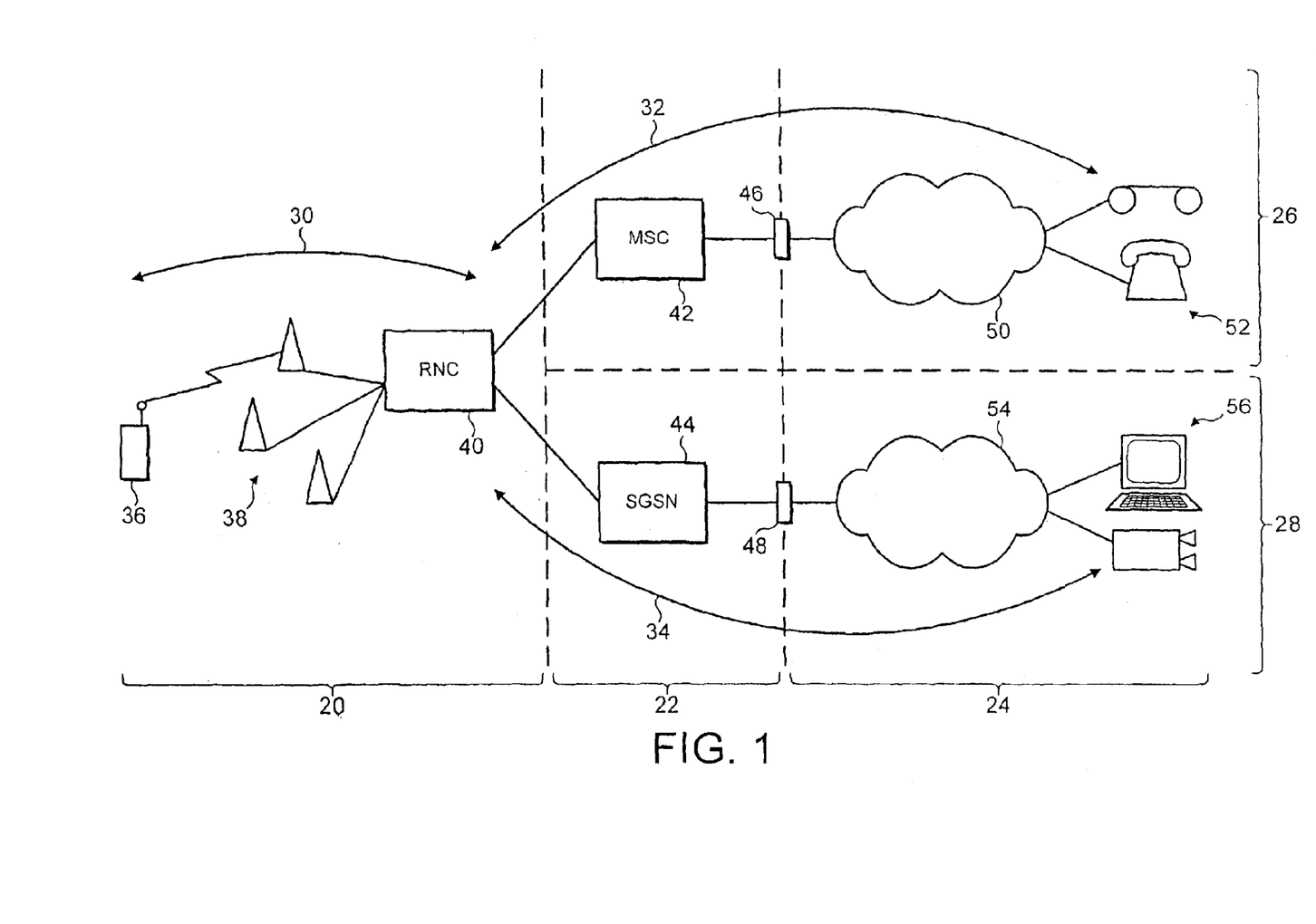
FIG. 1 is a schematic representation of a UMTS network and user networks.

Firstly, the overall structure of the entire UMTS network will be described with reference to FIG. 1. The UMTS network is broadly comprised of two parts, namely a radio access network (RAN) shown by bracket 20 and a core network (CN) shown by bracket 22. It provides services to user networks, which are shown by bracket 24.

The CN 22 and the user networks 24 are a combination of two different parts, a circuit-switched part indicated by bracket 26 and a packet-switched part indicated by bracket 28. Packet and circuit data are transferred within RAN 20 over a radio link indicated by arrow 30. Circuit switched data uses the circuit switched part 26 as indicated by arrow 32 and packet-switched data uses the packet-switched part as indicated by arrow 34.

Within the RAN 20 there is depicted a mobile phone 36, several base stations 38 and an RNC 40. The mobile phone 36 will communicate over one or more data links and will therefore be attached to one or more base stations 38 at any one time, through which it communicates with the rest of the network. If it moves into the coverage area of a different base station with respect to any data link, an updating process will need to be carried out in order to maintain the necessary association between network components, as will be described below. The RNC 40 is capable of communication with all the base stations 38.

Within the CN 22 there is provided an MSC 42 and an SGSN 44. Each of these is capable of communication with the RNC and with their respective user networks via respective gateways 46 and 48.

Gateway 46 provides a connection to the CS-part 26. Within the CS-part 26 there is a public switched telephone network (PSTN) 50, which is a standard land-line telephone network. This provides standard telephone services to homes and businesses, including additional services such as ISDN. Customer terminals for receiving such services are indicated by reference numeral 52.

Gateway 48 provides a connection to the PS-part 28. Within the PS-part there is the internet 54, which provides a multitude of services and is accessible by terminals as indicated by reference numeral 56.

Thus if the mobile phone 36 is connected in a call to a terminal 52, the call is routed via a base station 38 and RNC 40 to MSC 42, from where it is passed to PSTN 50 via gateway 46, and onto terminal 50. If the mobile phone 36 is connected to internet services, the call is routed via a base station 38 and RNC 40 to SGSN 44, from where it is passed to the internet 54. Regardless of which type of call the mobile is making or whether it is actually in a call or not, various network messages need to be transmitted to and from the mobile phone to and from components of the network such as MSCs and SGSNs. These are to deal with network issues such as location updates. Thus if the mobile phone moves, it is important for connections to be recognised between it and any new network components whose coverage area the mobile phone has moved into.

As mentioned previously, there are broadly two methods of allowing an update of the position of a mobile phone in order to achieve association and other network functions:

(i) Maintaining a continuous association (MSC-SGSN)

(ii) Use HLR lookups when the information about the partner CN node is needed.

If the association is consistently maintained in accordance with option (i), it means that both of the nodes always know the location of the other node, and, as explained above, combined procedures must be used in attaches, detaches and LA/RA updates, because the combined procedures include the association updating messages.

Under option (ii), no information about the other node is actively maintained, but instead, an HLR lookup is performed when the other address is needed. This option could be made more efficient by piggybacking the other node address information from the HLR in other existing messages, as will be described below. This method works because the HLR always knows the PS and CS nodes i.e. MSC and SGSN to which the mobile station was attached the last time. However, in, for example, the PS domain, in packet data protocol (PDP) context deactivation the HLR is not informed, so it does not know whether or not the mobile is still in active communication with that node. Combined procedures could be used, mostly with the same messages as in option (i). Only the contents of the messages need to be modified, because no address information for the other node is actually delivered to the requesting node.

Location updates will now be described in detail, considering each of options 1 and 2 described above.

Option (i): Maintaining a Continuous Association

The mobile phone can be considered to be in different call states:

CS-IDLE state—this means that there is not a call ongoing with the CS-part. An MSC knows the location of a mobile phone to the accuracy of its LA CS-CONNECTED state—this means that there is a call ongoing with the CS-part. An MSC knows the location of a mobile phone to the accuracy of its SRNC PS-IDLE state—this means that there is not a call ongoing with the PS-part. An SGSN knows the location of a mobile phone to the accuracy of its RA PS-CONNECTED—this means that there is a call ongoing with the PS-part. An SGSN knows the location of a mobile phone to the accuracy of its SRNC There are several possible ways of maintaining association between MSCs and SGSNs when the position of a mobile phone suggests a need for a location update. Three possible situations will be described with reference to FIGS. 2, 3 and 4. The figures only present how the association between SGSN and MSC may be maintained. The figures do not present all the messages exchanged during the procedures.

All three situations to be described below arise when a mobile phone is moving location such that it spans two RNC areas and there is a need to consider a reattachment to a different RNC, that is a change to a different SRNC and reattachment to a different switch, that is a different MSC or SGSN. Mere change of position to a different base station involving no other equipment changes, would just be carried out as an ordinary location update to the new base station.

Figure 2:
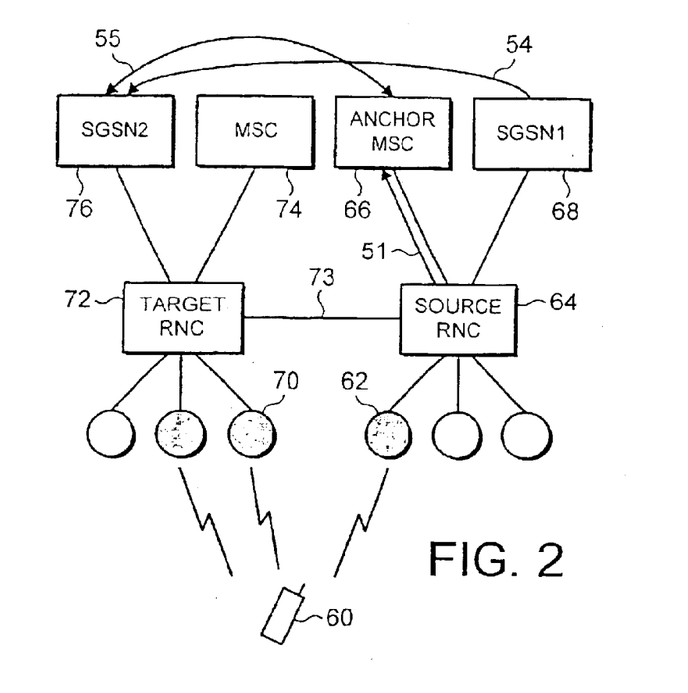
FIG. 2 depicts a method according to the invention in which there is an ongoing connection to the circuit-switched part and location updates are not allowed

The first situation is CS-CONNECTED, PS-IDLE and is depicted in FIG. 2. Since the call is being routed via MSC 66 it is not possible to break the connection between the mobile phone 60 and MSC 66 because that would result in data being lost. In this situation location updates to a different SRNC are not allowed. Instead, an association must be created by combined PS/CS attach. Before the procedure in accordance with the embodiment begins, partner MSCs and SGSNs know one another's address.

Referring to FIG. 2, there is a mobile phone 60 located within the coverage area of a base station 62, which is capable of communicating with source RNC 64. Source RNC 64 is capable of communicating with anchor MSC 66 and SGSN1 68. Source RNC 64 is also connected to target RNC 72 via a communication link 73. Target RNC 72 is capable of communicating with MSC 74 and SGSN2 76. Before the procedure, anchor MSC knows the address of SGSN1 and SGSN1 knows the address of anchor MSC.

The following signalling steps are carried out:

Step S1—source RNC 64 sends an "SRNC relocation required" message to anchor MSC 66. The message includes the address of target RNC 72. The message is included in the usual serving RNC relocation procedure.

Step S2—anchor MSC 66 saves the address of target RNC 72.

Step S3—a routing area update is performed. The signalling scenario is familiar from GPRS. In the situation under consideration, this update results in a change of SGSN to SGSN2 76.

Step S4—SGSN1 68 sends the address of anchor MSC 66 to SGSN2 76. SGSN1 68 could piggyback the address of anchor MSC 66 in its "SGSN context response" message which forms part of the routing area update procedure.

Step S5—SGSN2 76 sends an "association update request" message to anchor MSC 66 and anchor MSC 66 acknowledges the message by sending an "association update response" message to SGSN2 76.

After the procedure, anchor MSC 66 knows the address of SGSN2 76, SGSN2 76 knows the address of anchor MSC 66 and anchor MSC 66 knows the address of target RNC 72 (new SRNC). The CS-call is maintained by being routed via base station 70 to target RNC 72, along the communication link 73 to source RNC 64 and on to anchor MSC 66. If the mobile phone 60 has the capability of carrying out two calls at once, following the procedure it would be able to connect to the PS-part at any time via base station 70 to target RNC 72 and then directly to SGSN2 76. Since anchor MSC 66 knows the address of SGSN2 76, it is able to make an activity enquiry to SGSN2 76 at any time, to ascertain whether the mobile phone 60 has an active connection with SGSN2 76. Furthermore, it is able to page mobile phone 60 in an efficient manner since it knows the address of target RNC 72.

When the CS-call ends, a full location update is carried out so that any subsequent CS-calls will be routed via base station 70 to target RNC 72 and directly to MSC 74. PS-calls will be routed via base station 70 to target RNC 72 and directly to SGSN 76.

Figure 3:
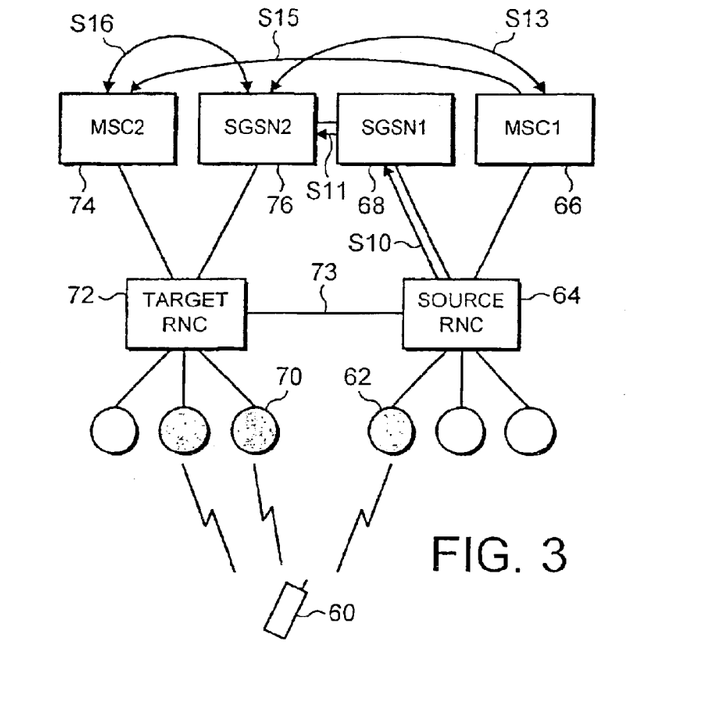
FIG. 3 depicts a method according to the invention in which there is an ongoing connection to the packet-switched part and location updates are not allowed

The second situation is CS-IDLE, PS-CONNECTED and is depicted in FIG. 3. Initially, the active data connection (which is a PS call) is being routed via SGSN1 68. In contrast to the first situation, the CS-connected case, it is possible to move control of the connection from SGSN1 68 to a second SGSN via a serving RNC relocation procedure, followed by a routing area update. The SRNC is managing the connectivity of the mobile station to the network and it is the SRNC that decides that a SRNC relocation is required and triggers the process with the SGSN, and consequently the routing area update. An association must be created by combined PS/CS attach. The procedure needs to be longer than for the first case because during a PS-call it is necessary to maintain connection with MSC1 66 as well as SGSN1 68 Before the procedure in accordance with the embodiment begins, partner MSCs and SGSNs know one another's address.

Referring to FIG. 3, the part of the network shown is the same. Before the procedure, SGSN1 knows the address of MSC1, and MSC1 knows the address of SGSN1.

The following signalling steps are carried out:

Step S10—source RNC 64 sends "SRNC relocation required" message to SGSN1 68. The message includes the address of target RNC 72. The message is included in the usual SRNC relocation procedure.

Step S11—SGSN1 68 sends "forward SRNC relocation" message to SGSN2 76. The message is included in the usual serving RNC relocation procedure. SGSN1 68 could piggyback the address of MSC1 66 in the message.

Step S12—SGSN2 76 saves the address of target RNC 72. Change of SRNC is now performed, followed by RAU.

Step S13—SGSN2 76 sends "association update request" message to MSC1 66. MSC1 66 acknowledges the message by sending Association Update Response—message to SGSN2.

Step S14—location area update is performed. The signalling scenario is familiar from GSM. In this case, the location area update results in MSC change.

Step S15—MSC1 66 sends the address of SGSN2 76 to MSC2 74. MSC1 66 could piggyback the address of SGSN2 76 to the message sent in a MAP_SEND_IDENTIFICATION-SERVICE message.

Step S16—MSC2 74 sends an "association update request" message to SGSN2 76. SGSN2 76 acknowledges the message by sending an "association update response" message to MSC2 74.

After the procedure, SGSN2 76 knows the address of MSC2 74, MSC2 74 knows the address of SGSN2 76, and SGSN2 76 knows the address of target RNC 72 (new SRNC). The PS-call is maintained by being routed via base station 70 to target RNC 72, along the communication link 73 to source RNC 64 and on to SGSN1 68. If the mobile phone 60 has the capability of carrying out two calls at once, following the procedure it would be able to connect to the CS-part at any time via base station 70 to target RNC 72 and then directly to MSC2 74. Since SGSN2 76 knows the address of MSC2 74, it is able to make an activity enquiry to MSC2 74 at any time, to ascertain whether the mobile phone 60 has an active connection with MSC2 74. Furthermore, it is able to page mobile phone 60 in an efficient manner since it knows the address of target RNC 72.

Figure 4:
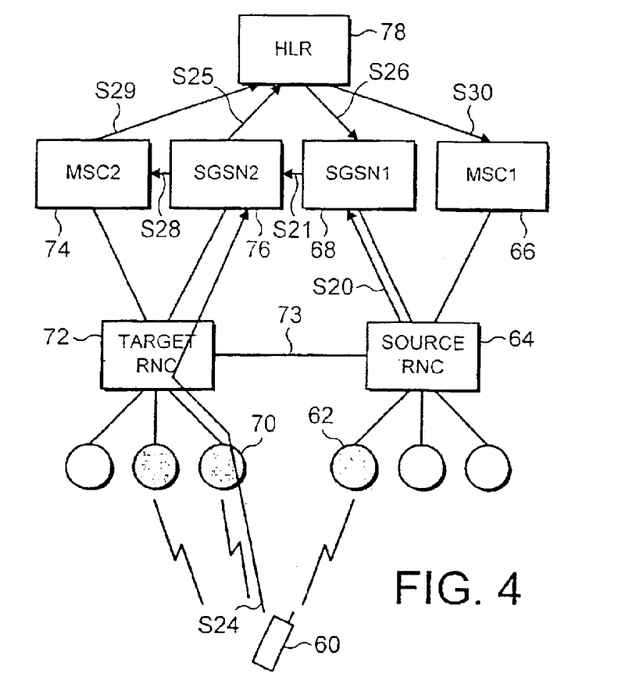
FIG. 4 depicts a method according to the invention in which there is an ongoing connection to the packet-switched part and location updates are allowed

The third situation is similar to the second situation and is depicted in FIG. 4.

Referring to FIG. 4, the part of the network shown is the same, but in addition, a home location register (HLR) 78 is shown. Before the procedure, SGSN1 knows the address of MSC1, and MSC1 knows the address of SGSN1.

The following signalling steps are carried out:

Step S20—source RNC 64 sends SRNC 64 "relocation required" message to SGSN1 68. The message includes the address of target RNC 72. The message is included in the serving RNC relocation procedure.

Step S21—SGSN1 68 sends "forward SRNC relocation" message to SGSN2 76. The message includes the address of target RNC 72. The message is included in the serving RNC relocation procedure.

Step S22—SGSN2 76 saves the address of target RNC 72.

Step S23—combined routing area/location area update is performed. The messages below are included in the combined routing area/location area update procedure and are familiar from GPRS.

Step S24—mobile phone 60 sends "routing area update request" message to SGSN2 76 via RNC 72. This message includes enough information for SGSN2 76 to determine that in addition, a location area update towards MSC2 74 must be initiated.

Step S25—SGSN2 76 sends "update location" message to the HLR 78.

Step S26—HLR 78 sends "cancel location" message to SGSN1.

Step S27—SGSN2 76 determines and saves the address of MSC2 74.

Step S28—SGSN2 76 sends "location update request" message to MSC2 74. The message includes the address of SGSN2 76.

Step S29—MSC2 74 sends "update location" message to the HLR 78.

Step S30—HLR 78 sends "cancel location" message to MSC1 66.

After the procedure, SGSN2 knows the address of MSC2 and MSC2 knows the address of SGSN2. The PS-call is continued via RNC 70 and SGSN2 76.

For a fourth situation of CS-IDLE, PS-IDLE, there is no call ongoing and association is maintained with the combined routing area/location area update procedure. The procedure is familiar from GPRS.

Option (ii): Use HLR Lookups When the Information About the Partner CN Node is Needed Explicit association maintaining, as described with reference to option (i), requires association updating on SGSN and MSC changes (depending on call states). In HLR lookup, all these association updating messages are avoided. HLR lookup introduces a simple solution, an implicit Gs association. The idea is to use HLR for looking up the partner node's address only when it is needed. The HLR can always provide the last registered switching node's address of both of the domains.

HLR does not know whether the address it provides is still active, because this information is not provided to HLR in this embodiment. It would be possible to provide the information in an alternative embodiment. In this embodiment, for this reason, activity enquiries are used. These enquiries are not necessarily needed, but they can be used to make sure that the other node is active and to find out the SRNC address.

When using HLR lookup, combined RA/LA update procedures can be used if so wanted, However, this is not mandatory as it is under option (i).

Overall, HLR lookup provides a simple all-round solution with no association maintaining messages. It would be suitable for a situation in which the information about the other node is not needed as often, and thus frequent updating can be avoided. HLR Lookup can also be used with any new functionalities developed in Gs interface in the future.

Option (ii) works by the addition of two new messages in the Gr interface. The information is requested from the HLR with an "HLR lookup request" and a response is sent in an "HLR lookup response" message. The address is only requested when needed and no association has to be actively maintained.

Because there is no explicit association, no handover indication procedure is invoked after the SGSN floating procedure or after any other location updating procedure.

Under this option (ii), there are several situations when the other domain address has to be requested from HLR. Some of these are CS paging through SGSN, Network Requested PDP Context activation through a wideband MSC (MSC) and combined detach.

In some situations such as combined attach and combined RA/LA update, the HLR does not know the new address. Therefore it has to be provided by other means such as by the mobile phone itself or by the radio network system (RNS).

The location information obtained from the HLR on request can be used to make an activity enquiry of the partner node. Enquiries are not necessarily needed, but they can be used to find out the SRNC address, and additionally it can be ensured that the other node really is active. The other node will respond to an enquiry either with the SRNC address, or an indication that it itself is no longer involved in a connection. The HLR does not know whether the mobile phone is still active in the node area.

HLR lookups can also be used for notification service needs, for example setting up so that a node sends a signal only once to notify its partner node the next time there is a connection established or released.

The HLR lookup concept could be further enhanced by piggybacking the address information in other messages. This is possible in CS paging and in packet data protocol (PDP) context activation through a MSC, in which situation there are some mandatory messages going to the HLR anyway. In these special cases, HLR lookup messages could even be removed, as will be described in detail below. Thus the functionality remains the same, but no extra lookup messages are needed, since existing messages just need to be modified.

The methods described herein may be implemented with the used of at least some of the messages proposed for the BSSAP+ protocol.

With both PS- and CS-IDLE, a node can make an activity enquiry to its partner node. The response includes either an SRNC address or an inactivity indication. It would be possible in a different embodiment for activity enquiries not to be used, and instead, for example paging would be directly delivered to the last known SGSN, which in the case that it is inactive would return a message not acknowledging the paging delivery.

To avoid unnecessary messages being sent, it is preferred that an activity enquiry into the last known CN node address is only made when needed. However, it is desirable to allow a one-time procedure to inform the other node about the establishment or release of the next connection. The notification request is immediately acknowledged, and the node is notified in the next activation/release. The notification would probably not need to be acknowledged by the other node.

It is also possible for the notification procedure to be extended from the above-suggested one-time procedure ('inform me next time') into a temporary ('notify me during a defined time') or an all-time-notifying procedure.

In order to implement the required signals, some other BSSAP+ functionalities have also been used, including detach indication, and location update messages and temporary mobile subscriber identity (TMSI) reallocation complete.

There are four different ways of achieving the necessary signalling depending on the particular situation, which will each be considered in detail below:

(i) CS Paging Through SGSN

In this method, the partner address has to be fetched first in order to make an activity enquiry to ensure that it is active. The procedure could be advantageously adapted by removing the activity enquiry.

The signals are as follows:

1. The MSC receives a "call setup" message for a mobile terminated call.

2a. After analysing the mobile station international ISDN number (MSISDN), MSC sends a mobile application part (MAP) message "send routing information" to the HLR in order to get a roaming number 2b. The HLR looks for the MSISDN from its database to find the MSC/VLR (visitor location register) that is currently serving the mobile phone, and sends a MAP "provide roaming number" message to that MSC/VLR.

2c. The serving MSC/VLR generates a mobile station roaming number (MSRN) for the mobile phone and sends it to the HLR in a MAP "provide roaming number acknowledgement" message.

2d. The HLR saves the MSRN and sends a MAP "send routing information acknowledgment" message to the MSC.

3. MSC sends the "call setup" message to the serving MSC.

4a. MSC asks the HLR for the last-known SGSN address with an "HLR lookup request" message.

4b. HLR returns the last-known. SGSN address in an "HLR lookup response" message.

5a. MSC sends an activity enquiry request to the last-known SGSN.

5b. The last-known SGSN responds with an activity enquiry response, indicating either the SRNC address or that the mobile phone is PS-inactive.

6. The MSC makes a paging request to the mobile phone. If there is an existing radio resource call (RRC) connection (i.e. the PS-active state), the paging request is delivered to the SRNC only. If the mobile phone is PS-inactive, the paging request is delivered to the entire RA. If the mobile phone is PS-inactive, the request is sent to all RNCs in the LA, and from the RNCs to all node Bs.

7. The RNC sends the paging message to the mobile phone. If there is an existing radio resource call (RRC) connection (i.e. the PS-active state), a dedicated channel is used.

In an alternative embodiment, the information carried by the two messages 4a&4b could be piggybacked in the message of signal 2c. Thus there would be no need for messages 4a and 4b as separate messages. However, message 2c would need to include the VLR address.

(ii) Network Requested PDP Context Activation Through MSC—Successful Case

In this method, as under method (i) the partner address has to be fetched first in order to make an activity enquiry to ensure that it is active. The procedure could be enhanced by removing the activity enquiry.

The signals are as follows:

1. GGSN receives protocol data units (PDUs) and determines that a "network-requested PDP context procedure" has to be initiated.

2. GGSN asks the HLR for the location in terms of SGSN of the mobile phone.

3. HLR responds with either the requested information or an error and the cause of the error if the request cannot be served (e.g. IMSI unknown in HLR).

4. If the SGSN address is present, the GGSN sends a "PDU notification request" to the SGSN.

5. The SGSN responds that it will request the mobile phone to activate the PDP context.

6. The SGSN sends an "HLR lookup request" message to the HLR.

7. The HLR responds with an "HLR lookup response", indicating the MSC address.

8. The SGSN sends an "activity enquiry request" message to the MSC.

9. The MSC responds with an "activity enquiry response" message, indicating either the SRNC address or that the mobile phone is CS-inactive.

10. The SGSN initiates a "network-requested PDP context activation" procedure towards the mobile phone. If there is an existing RRC connection, the request is sent to the SRNC only, and from that on to the mobile phone using the existing dedicated channel. If the mobile phone is CS-inactive, the request is sent to all RNCs in the RA, and from the RNCs of the RA to all node Bs.

In an alternative embodiment, the information carried by the two messages 6 and 7 could be piggybacked in messages 2 and 3. In that case, messages 6 and 7 would not be required as separate messages. However, message 2 would need a flag to be included, indicating that the VLR address has to be included in message 3 and message 3 would include the VLR address.

(iii) Combined Mobile Phone—Initiated PS/CS Detach

In this method, as under methods (i) and (ii), the partner address has to be fetched first.

The signals are as follows:

1. The mobile phone detaches by sending a "detach request" message to the SGSN. The "detach type" indicates which type of detach is to be performed. This can be PS-detach only, CS-detach only or combined PS- and CS-detach.

2. If the request is for a PS-detach, the active PDP contexts in the GGSNs regarding this particular mobile phone are deactivated by the SGSN sending a "delete PDP context request" message to the GGSNS. The GGSNs acknowledge the request with a "delete PDP context response" message.

In the alternative:

2a. If the request is for a CS-detach, the SGSN sends an "HLR lookup request" message to the HLR.

2b. The MSC returns an "HLR lookup response" message.

3. If the request is for CS-detach, the SGSN sends a "combined detach" indication to the VLR.

For both cases, the final signal is for the SGSN to send a "detach accept" message to the mobile phone.

(iv) Combined Inter SGSN RA/LA Update, Combined PS/CS Attach

This method is suitable for use in two situations, that is combined inter-SGSN RA/LA update and combined PS/CS attach. In the procedure the HLR does not know the new SGSN/MSC addresses, so they have to be provided to the SGSN some other way. The way is common to both situations. In GPRS, the base station system (BSS) adds the new RA/LA information to the attach or RA/LA update request messages, when they are delivered from the mobile phone to the SGSN. In the UMTS system of the embodiment, this technique could be adapted, letting the RNS add that information. Alternatively, the mobile phone could be used., since it will, in any case, know both its RA and LA from provided mobility management (MM) information either broadcasted on a cell or provided by RNS on the dedicated channel, if both of these domains are active at that time. So the mobile phone could also provide the 3G-SGSN with the LA information in the attach & RA/LA update request message.

The new SGSN has to know the old SGSN address in order to send an identification request to it, so that address must also be provided to the SGSN. The new MSC address could be provided at the same time.

As indicated above, the following procedure works in a similar manner to the corresponding procedures in GPRS. However, these procedures have not been applied to 3G in a UMTS system. The following procedure is suitable for a combined RA/LA Update including inter-SGSN RA update.

Before the signalling can start, an RRC connection is established in the Iu interface. The signals are:

1. The mobile phone sends a "routing area update request" to the new SGSN. The update type indicates either combined RA/LA update, or combined RA/LA update with IMSI attach.

2. The new SGSN sends an "SGSN context request" message to the old SGSN to get the MM and PDP contexts for the mobile phone. If the security functions authenticate the mobile phone correctly, the old SGSN responds with the "SGSN context". The old SGSN stores the address of the new SGSN until the old MM context is cancelled, to allow the old SGSN to forward data packets to the new SGSN. The old SGSN starts a timer and stops the downlink transfer 3. Security functions may be executed between the mobile phone and the new SGSN.

4. The new SGSN sends an "SGSN context acknowledge" message to the old SGSN. This informs the old SGSN that the new SGSN is ready to receive data packets belonging to the activated PDP contexts. The old SGSN marks in its context that the information in the GGSNs and the HLR are invalid. This triggers the GGSNs, and the HLR to be updated if the mobile phone initiates a routing area update procedure back to the old SGSN before completing the ongoing routing area update procedure.

5. The old SGSN duplicates the buffered N-PDUs and starts tunnelling them to the new SGSN.

6. The new SGSN sends an "update PDP context request" message to the GGSNs concerned ( . . . which are those GGSNs? . . . ). The GGSNs update their PDP context fields and return an "update PDP context response" message.

7. The new SGSN informs the HLR of the change of SGSN by sending an "update location" message to the HLR.

8. The HLR sends a "cancel location" message to the old SGSN. The old SGSN acknowledges with a "cancel location acknowledgement" message.

9. The HLR sends "insert subscriber" data to the new SGSN. The new SGSN validates the mobile phone's presence in the (new) RA. The SGSN constructs an MM context for the mobile phone and returns an "insert subscriber data acknowledgement" message to the HLR.

10. The HLR acknowledges the "update location" by sending an "update location acknowledgement" message to the new SGSN.

11. The new SGSN sends a location update request to the VLR. The activity of the provided MSC/VLR address is not queried because if an address is able to be provided, it will certainly be active. The SGSN gets the new MSC/VLR address from MM information provided by mobile phone or added by RNS.

12. The HLR cancels the old VLR and inserts subscriber data in the new VLR:

12a. The new VLR sends an Update Location to the HLR.

12b. The HLR cancels the data in the old VLR by sending a "cancel location" message to the old VLR.

12c. The old VLR acknowledges with a "cancel location acknowledgment.

12d. The HLR sends insert subscriber data to the new VLR.

12e The new VLR acknowledges with an insert subscriber data acknowledgment message.

12f. The HLR responds with an update location acknowledgement to the new VLR.

13. The new VLR allocates a new TMSI and responds with a "location update accept" message to the SGSN. The specific allocation of a VLR TMSI is optional if the VLR has not changed.

14. The new SGSN validates the mobile phone's presence in the new RA. If due to regional, national or international restrictions the mobile phone is not allowed to attach in the RA or subscription checking fails, then the SGSN rejects the routeing area update, signalling the appropriate cause. If all checks are successful then the new SGSN establishes MM and PDP contexts for the mobile phone. A logical link is established between the new SGSN and the mobile phone. The new SGSN responds to the mobile phone with a "routing area update accept".

15. The mobile phone confirms the reallocation of the TMSIs by sending a "routing area update complete" message to the SGSN.

16. If the VLR TMSI is confirmed by the mobile phone, the new SGSN sends a "TMSI reallocation complete" message to the new VLR 17. The SGSN tells the RNC to release the RRC connection with a release message. Then the RRC connection is released.

The applicant draws attention to the fact that the present invention may include any feature or combination of features disclosed herein either implicitly or explicitly or any generalization thereof, without limitation to the scope of any of the present claims. In view of the foregoing description it will be evident to a person skilled in the art that various modifications may be made within the scope of the invention.

What is claimed is:

1. A method for maintaining association between switching units in a network, the network comprising:
   a first part switched according to a first protocol;
   a second part switched according to a second protocol;
   a first switching unit and a second switching unit capable of communication with the first part;
   a third switching unit and a fourth switching unit capable of communication with the second part;
   a first base station and a second base station, each base station being capable of radio communication with a mobile station located within its respective coverage area;
   a first routing unit capable of communication with each of the first base station, the first switching unit and the third switching unit; and
   a second routing unit capable of communication with each of the second base station, the second switching unit and the fourth switching unit; and
   a routing link interconnecting the first routing unit and the second routing unit; the first switching unit having access to the address of the third switching unit, whereby the first switching unit is capable of addressing the third switching unit for determining whether the mobile station is communicating with the second part via the third switching unit;
   there being a mobile station being located within the coverage area of the first base station and being capable of being connected in a call with the first part or the second part via the first routing unit; and
   the method comprising the steps of, when the mobile station is connected in a call routed to the first part via the first base station, the first routing unit and the first switching unit and the mobile station is within the coverage area of the second base station;
      determining that the call is to be transferred to be routed to the first part via the second base station, the second routing unit, the first routing unit and the first switching unit;
      routing the call to the first part via the second base station, the second routing unit, the routing link, the first routing unit and the first switching unit; and
      transmitting an association message to the first switching unit to inform it of the address of the fourth switching unit;
   whereby the mobile station is capable of communicating with the second part via the fourth switching unit, and the first switching unit is capable of addressing the fourth switching unit for determining whether the mobile station is communicating with the second part via the fourth switching unit.

2. A method as claimed in claim 1, wherein the association message is transmitted to the first switching unit by the fourth switching unit.

3. A method as claimed in any preceding claim 2, wherein the first switching unit transmits a message to the fourth switching unit acknowledging the association message.

4. A method as claimed in claim 1, comprising the further steps of:
   the first routing unit sending a signal to the first switching unit, indicating that the mobile station is moving into the coverage area of the second base station and giving the address of the second routing unit;
   the first switching unit saving this address; and
   the third switching unit sending the address of the first switching unit to the fourth switching unit to enable it to send the association message to the first switching unit, whereby the first switching unit knows the address of the second routing unit.

5. A method as claimed in claim 4, wherein the step of the third switching unit sending the address of the first switching unit to the fourth switching unit is carried out by modifying another message.

6. A method as claimed in claim 1, wherein the first part is circuit-switched and the second part is packet-switched.

7. A method as claimed in claim 1, wherein the first and second switching units are mobile switching centres and the third and fourth switching units are nodal switches.

8. A method as claimed in claim 7, wherein the nodal switches are SGSNs.

9. A method as claimed in claim 1, wherein the first and second routing units are radio network controllers.

10. A method according to claim 1, comprising the further step of when the call ends, the mobile station making a full location update to render it capable of being connected in a call with the first part or the second part via the second routing unit and the second switching unit or the fourth switching unit.

11. A method according to claim 1, wherein there are a plurality of mobile stations within the coverage area of the first base station and being capable of being connected in a call with the first part or the second part via the first routing unit, and one or more of them is within the coverage area of the second base station and the method is operable in relation to any or all of said one or more mobile stations.

12. A method as claimed in claim 1, wherein the network comprises an HLR and the method comprises the step of transmitting a first message to the HLR to inform the HLR of the address of the fourth switching unit available to the mobile station, and the association message is transmitted to the first switching unit by the HLR.

13. A method for maintaining association between switching units in a network, the network comprising:
   a first part switched according to a first protocol;
   a second part switched according to a second protocol;
   a first switching unit and a second switching unit capable of communication with the first part;
   a third switching unit and a fourth switching unit capable of communication with the second part;

a first base station and a second base station, each base station being capable of radio communication with a mobile station located within its respective coverage area;

a first routing unit capable of communication with each of the first base station, the first switching unit and the third switching unit; and a second routing unit capable of communication with each of the second base station, the second switching unit and the fourth switching unit; and a routing link interconnecting the first routing unit and the second routing unit; the first switching unit knowing the address of the third switching unit, whereby the first switching unit is capable of addressing the third switching unit for determining whether the mobile station is communicating with the second part via the third switching unit;

there being a mobile station being located within the coverage area of the first base station and being capable of being connected in a call with the first part or the second part via the first routing unit; and the method comprising the steps of, when the mobile station is connected in a call routed to the first part via the first base station, the first routing unit and the first switching unit and the mobile station is within the coverage area of the second base station;

determining that the call is to be transferred to be routed to the first part via the second base station, the second routing unit, the first routing unit and the first switching unit:

routing the call to the first part via the second base station, the second routing unit, the routing link, the first routing unit and the first switching unit; and transmitting a first association message to the third switching unit to inform it of the address of the second switching unit; and transmitting a second association message to the second switching unit to inform it of the address of the fourth switching unit;

whereby the mobile station is capable of communicating with the second part via the fourth switching unit, and the second switching unit is capable of addressing the fourth switching unit for determining whether the mobile station is communicating with the second part via the fourth switching unit.

14. A method as claimed in claim 13, wherein the first association message is transmitted to the third switching unit by the second switching unit and the second association message is transmitted to the second switching unit by the fourth switching unit.

15. A method as claimed in claim 13, wherein the third switching unit transmits a message to the second switching unit acknowledging the first association message and the second switching unit transmits a message to the fourth switching unit acknowledging the second association message.

16. A method as claimed in claim 13, comprising the further steps of:

the first routing unit sending a signal to the first switching unit, indicating that the mobile station is moving into the coverage area of the second base station and giving the address of the second routing unit;

the first switching unit forwarding the said signal to the second switching unit to enable it to send the first association message to the third switching unit the second switching unit saving the address of the second routing unit;

the third switching unit sending the address of the second switching unit to the fourth switching unit to enable it to send the second association message to the second switching unit, whereby the second switching unit knows the address of the fourth switching.

17. A method as claimed in claim 16, wherein the step of the first switching unit forwarding the said signal to the second switching unit and the step of the third switching unit sending the address of the first switching unit to the fourth switching unit are carried out by modifying other messages.

18. A method as claimed in claim 13, wherein the first part is packet-switched and the second part is circuit-switched.

19. A method as claimed in claim 13, wherein the first and second switching units are nodal switches and the third and fourth switching units are mobile switching centres.

20. A method as claimed in claim 19, wherein the nodal switches are SGSNs.

21. A method as claimed in claim 13, wherein the first and second routing units are radio network controllers.

22. A method according to claim 13, comprising the further step of when the call ends, the mobile station making a full location update to render it capable of being connected in a call with the first part or the second part via the second routing unit and the second switching unit or the fourth switching unit.

23. A method according to claim 13, wherein there are a plurality of mobile stations within the coverage area of the first base station and being capable of being connected in a call with the first part or the second part via the first routing unit, and one or more of them is within the coverage area of the second base station and the method is operable in relation to any or all of said one or more mobile stations.

24. A method as claimed in claim 13, wherein the network comprises an HLR and the method comprises the further steps of:

transmitting a first message to the HLR to inform the HLR of the address of the second switching unit available to the mobile station, and the first association message is transmitted to the third switching unit by the HLR;

transmitting a second message to the HLR to inform the HLR of the address of the fourth switching unit available to the mobile station, and the second association message is transmitted to the second switching unit by the HLR.

* * * * *